T. Bell,
Paddle Wheel.
No 96.075          Patented. Oct. 26. 1869.
Fig: 1
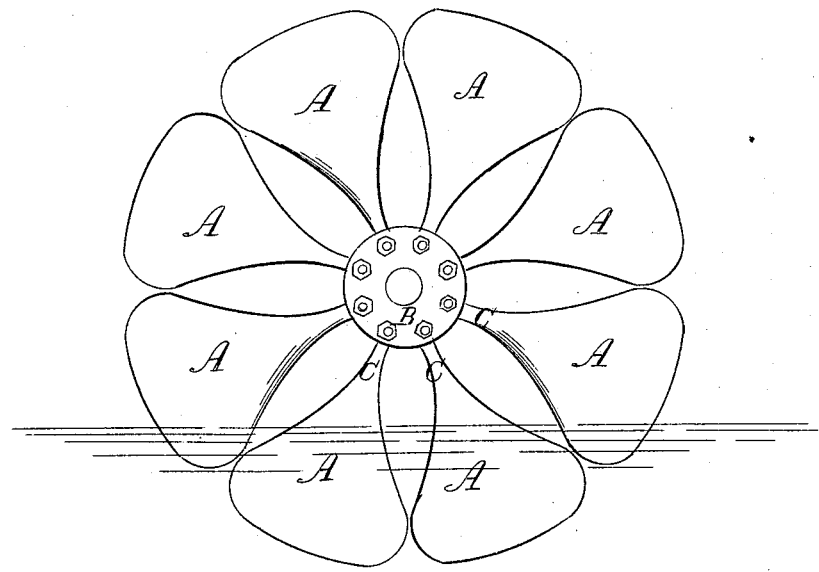
Fig: 3.
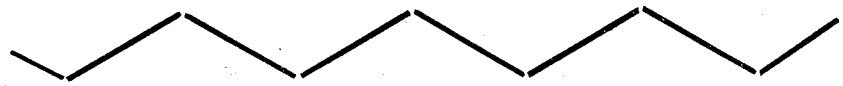
Fig: 2.
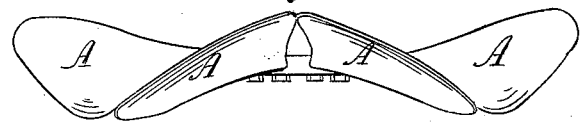
Witnesses
John T. Brooks
E. Greene Collins
Inventor
Thomas Bell.
per Winn & Co
Attorneys

United States Patent Office.

THOMAS BELL, OF BELLPORT, NEW YORK.

Letters Patent No. 96,075, dated October 26, 1869.

IMPROVEMENT IN PROPELLERS.

The Schedule referred to in these Letters Patent and making part of the same.

*To all whom it may concern:*

Be it known that I, THOMAS BELL, of Bellport, in the county of Suffolk, and State of New York, have invented a new and useful Improvement in Propelling-Wheels; and I do hereby declare that the following is a full, clear, and exact description thereof, which will enable others skilled in the art to make and use the same, reference being had to the accompanying drawings, forming part of this specification.

This invention relates to a new and useful improvement in wheels for propelling vessels in the water, whereby they are rendered more effective than when made in the ordinary manner; and The invention consists in forming the wheel of separate and independent paddles or blades attached to a central hub, so that they are adjustable therein, and so constructing the said paddles or blades, of steel or other suitable material, that they shall spring or be flexible, and so that the shank shall be subject to more or less torsion from the pressure of the water, as will be hereinafter more fully described.

Figure 1 represents a side view of a wheel, constructed according to my invention.

Figure 2 is an edge view of the same.

Figure 3 represents the periphery of the wheel, extended, or as a line, showing the ends of the blades.

Similar letters of reference indicate corresponding parts.

A represents the paddles or blades.

B is the eye or hub of the wheel.

The buckets or blades A, eight (more or less) in number, have each a shank, C, by which the blades are attached to the hub, so that they may be adjusted to any desired angle.

The blade expands from the shank, so as to give it a pear-shape, or any other desired form, it being a thin, flexible plate of steel or other suitable material, so elastic that it will spring, from the pressure, when it dips into the water, in the revolution of the wheel.

The shank C may be a torsion-spring, to act in combination with the springing blade, so that in striking the water, the blade will be turned by the spring, more or less, toward a right angle with the line of its rotation.

Upon leaving the water, the blade will resume its natural position, so that the "lift" will be comparatively small.

It will be seen that as the wheel is revolved, one edge of the inclined bucket will strike the water, and receive pressure therefrom first, which pressure will serve to spring the blade, as before stated, and also to twist or produce torsion to a greater or less degree in the shank C.

The blade, being forced by the pressure to assume an angle of greater resistance, will retain that position as long as the pressure continues.

When the blade ascends, the edge which first entered will of course leave first, and, the pressure being removed, the blade will resume its normal position.

The lift of water is, in this manner, in a great measure avoided.

The position of the blades is indicated in fig. 3. They do not touch each other, but each acts entirely independent of the rest, striking the water in succession on the opposite sides.

This method of constructing a propelling-wheel obviates all the difficulties incident to the feathering-devices so common, besides avoiding the expenses attending such complicated arrangements.

Having thus described my invention,

I claim as new, and desire to secure by Letters Patent—

Making the shank of a paddle or blade, used for propelling-purposes, so that it will act as a torsion-spring, substantially as and for the purposes set forth.

The above specification of my invention signed by me, this 11th day of December, 1868.

THOS. BELL.

Witnesses:
FRANK BLOCKLEY,
ALEX. F. ROBERTS.